United States Patent
Bossenmaier et al.

[11] Patent Number: 6,142,522
[45] Date of Patent: Nov. 7, 2000

[54] KNEE PROTECTION DEVICE IN A MOTOR VEHICLE

[75] Inventors: Alban Bossenmaier, Gaeufelden; Friedrich Reiter, Sindelfingen, both of Germany

[73] Assignee: DaimlerChrysler AG, Stuttgart, Germany

[21] Appl. No.: 09/132,503

[22] Filed: Aug. 11, 1998

[30] Foreign Application Priority Data

Aug. 12, 1997 [DE] Germany ............... 197 34 751

[51] Int. Cl.[7] ............................................. B60R 21/045
[52] U.S. Cl. .......................................................... 280/752
[58] Field of Search ............................ 280/748, 751, 280/752; 296/70

[56] References Cited

U.S. PATENT DOCUMENTS

| | | | |
|---|---|---|---|
| 3,113,788 | 12/1963 | Johnston | 280/752 X |
| 3,930,665 | 1/1976 | Ikawa | 280/752 X |
| 4,156,045 | 5/1979 | Burger . | |
| 4,427,215 | 1/1984 | Weichenrieder et al. | 280/752 |
| 4,853,270 | 8/1989 | Wycech | 280/751 X |
| 4,978,136 | 12/1990 | Tomita et al. . | |
| 5,273,314 | 12/1993 | Sakakibara . | |
| 5,316,834 | 5/1994 | Matsuda et al. . | |
| 5,370,417 | 12/1994 | Kelman et al. | 280/751 |
| 5,433,478 | 7/1995 | Naruse | 280/751 |
| 5,456,494 | 10/1995 | Witkovsky | 280/752 |
| 5,577,770 | 11/1996 | Sinner et al. | 280/752 |
| 5,641,195 | 6/1997 | Patel et al. | 280/751 X |
| 5,658,652 | 8/1997 | Sellergren | 296/70 X |
| 5,660,426 | 8/1997 | Sugimori et al. | 280/751 X |
| 5,700,050 | 12/1997 | Gonas | 296/70 X |
| 5,718,453 | 2/1998 | Kassel et al. | 280/748 X |
| 5,791,722 | 8/1998 | Nozaki et al. . | |
| 5,866,215 | 2/1999 | Karbhari et al. | 280/748 X |

FOREIGN PATENT DOCUMENTS

| | | |
|---|---|---|
| 0 378 314 B1 | 1/1990 | European Pat. Off. . |
| 0 684 164 A1 | 5/1995 | European Pat. Off. . |
| 2 061 595 | 7/1972 | Germany . |
| 2 332 420 | 1/1974 | Germany . |
| 30 46 677 A1 | 9/1981 | Germany . |
| 40 03 952 A1 | 8/1991 | Germany . |
| 41 05 027 C1 | 4/1992 | Germany . |
| 38 03 643 C2 | 12/1993 | Germany . |
| 42 32 846 A1 | 3/1994 | Germany . |
| 43 21 302 A1 | 1/1995 | Germany . |
| 44 18 628 A1 | 11/1995 | Germany . |
| 195 11 512 A1 | 2/1996 | Germany . |
| 42 20 704 C2 | 4/1996 | Germany . |
| 195 02 226 C1 | 5/1996 | Germany . |
| 60-222345 | 11/1985 | Japan . |
| 405213128 | 8/1993 | Japan | 280/752 |
| 405310063 | 11/1993 | Japan | 280/752 |
| 6-183306 | 7/1994 | Japan . |
| 406234343 | 8/1994 | Japan | 280/752 |

*Primary Examiner*—Brian L. Johnson
*Assistant Examiner*—Bryan Fischmann
*Attorney, Agent, or Firm*—Evenson, McKeown, Edwards & Lenahan, P.L.L.C

[57] ABSTRACT

A knee protection device in a motor vehicle comprises a bending-resistant load distributor plate which is arranged in the lower area of the dashboard. The device, which is made of plastic, extends in the transverse direction of the vehicle and is supported in the vehicle on at least one holder which can be bent in an energy-absorbing manner. An impact-resistant panel plate is disposed in front of this load distributor plate in the direction of the vehicle interior.

16 Claims, 1 Drawing Sheet

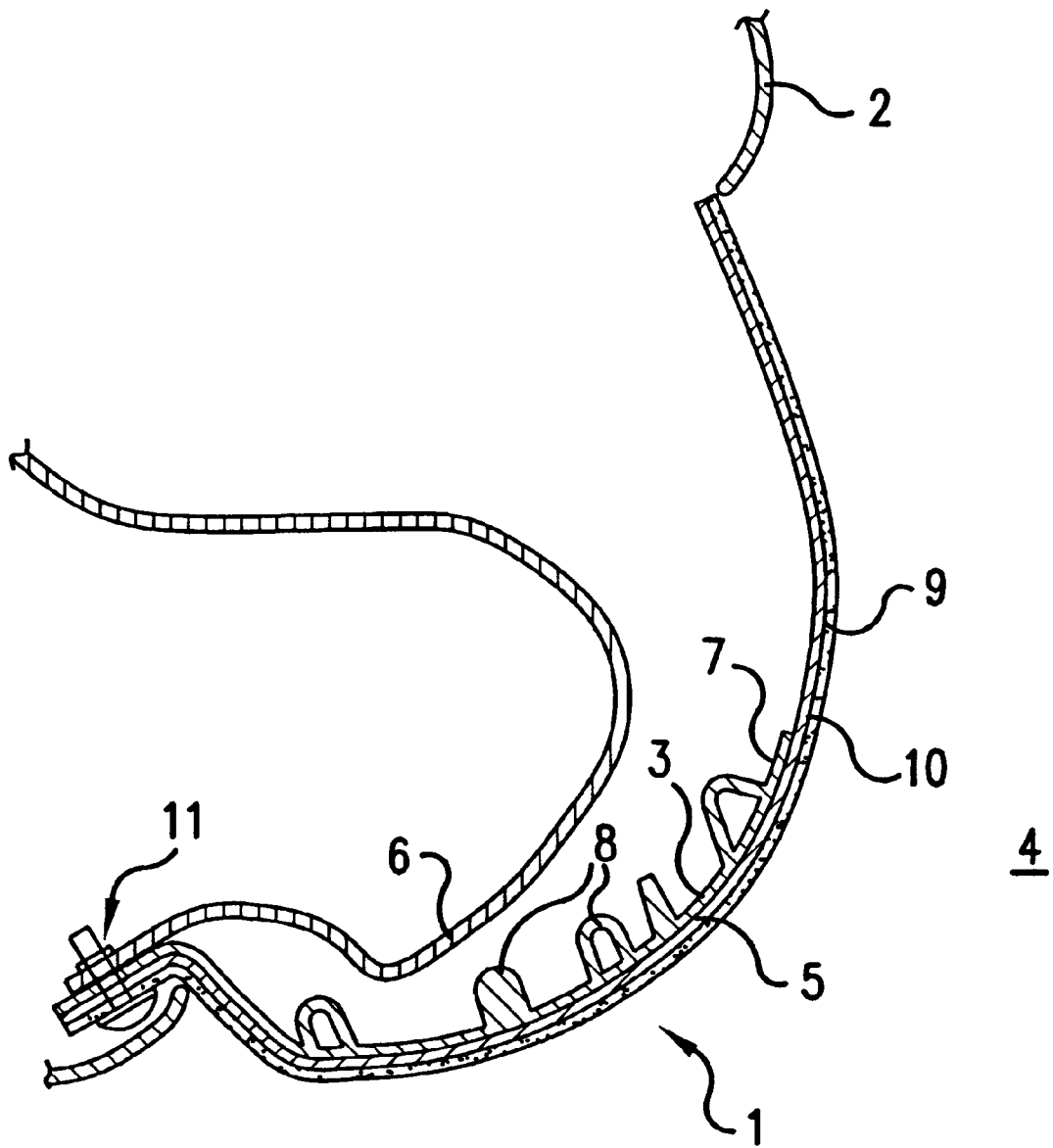

KNEE PROTECTION DEVICE IN A MOTOR VEHICLE

BACKGROUND OF THE INVENTION

This application claims the priority of German application 197 34 751.7, filed Aug. 12, 1997, the disclosure of which is expressly incorporated by reference herein.

The present invention relates to a knee protection device in a motor vehicle, and more particularly, to a knee protection device having a bending-resistant load distributor plate which is arranged in the lower area of the dashboard and extends in the transverse direction of the vehicle and is supported on at least one holder in the vehicle which can be bent in an energy-absorbing manner.

DE 40 03 952 A1 describes a motor vehicle knee protection device which comprises a metallic load distributor plate coated with foam on the vehicle-interior-side surface and disposed on a holder. The plate can be bent in an energy-absorbing manner, and at knee level in the vehicle interior so that it can be swivelled about a bearing point. The coating made of foamed material prevents that an occupant suffers a hard impact during the normal driving operation on the inflexible metallic load distributor plate.

As the result of its plane construction, the known load distributor plate is to form an impacting possibility for the occupant's knees along a wide area and not deform in the process so that it can introduce the introduced forces in a targeted and predeterminable manner into the deformable holding devices. In the event of a crash and a resulting impact of an occupant at a high force onto this knee protection device, the occupant's knees are pressed through the foamed-material coating and strike against the hard load distributor plate. Unfortunately, a relatively soft surface is combined with a particularly bending-resistant and hard load distributor plate which can undesirably contribute to an injury of the occupant's knees in the event of a hard impact during a crash.

U.S. Pat. No. 5,273,314 describes a corresponding hard load distributor plate which transmits force with a high stiffness and is foam-coated on the surface, is arranged on holding devices which can be deformed in an energy-absorbing manner.

U.S. Pat. No. 4,978,136 shows a metallic knee impact element behind a dashboard panel which is to be deformed during the impact of the occupant's knees and is to adapt itself to the knee so that the knee will not slide off the knee impact element. A targeted introduction of force into the bearing cannot be achieved in this manner.

DE 38 03 643 C2, DE 20 61 595 A1, DE 42 32 846 A1, DE 195 02 226 C1, JP 6-183306 (A), DE 195 11 512 A1 and DE 43 21 302 A1 describe knee cushions which are disposed on flexible holding devices and have no specific stably constructed plate which distributes the load. Furthermore, panel plates are shown in DE 44 18 628 A1 and EP 0 684 164 A1 which are carried by an air bag in the event of a crash.

Reference is also made as general background to DE 41 05 027 C1, DE 30 29 913 A1, EP 03 78 314 B1, DE 42 20 704 C2 and DE 23 32 420 A1 which show knee protection cushions which are disposed on metal plates and which do not interact with holding devices which can be deformed in an absorbing manner in the event of a crash.

SUMMARY OF THE INVENTION

An object of the present invention to provide a knee protection device for the impact of an occupant's knees in the event of a crash such that it is more advantageous with respect to injuries.

This object has been achieved in accordance with the present invention by providing that an impact-resistant panel plate is disposed in front of the load distributor plate, and in that the load distributor plate is made of plastic material.

In the knee protection device of the present invention, a plastic material bending-resistant load distributor plate is combined with a panel plate which is disposed in front toward the vehicle interior. As a result, the load distributor plate is constructed to be impact-resistant and have a high bending resistance. Because of the plastic material, however, the plate itself is softer in and, during the impact, has a less aggressive effect on the occupant's knee. This plastic load distributor plate makes possible a large force transmission because it can be constructed in an advantageous manner with respect to the manufacturing with molded-on material reinforcements or with a rib structure on the side facing the panel plate or facing away from it and/or may have a high fiber fraction. The panel plate which is disposed in front of the load distributor plate is resistant to impact and, if possible, does not break under a load, also reinforces the stability of the load distributor plate and, because of its material, offers a comfortable contact for the occupant in the normal driving operation. In an advantageous manner with respect to costs and recycling, this plate can be made of the same plastic material as the panel plate, or can be manufactured from plant-derived raw materials or recycled material.

An approximately uniform or isochronous common effect of the panel plate and of the load distributor plate of the knee protection device is promoted during the crash in that both plates rest against one another or are flatly connected with one another or in that the load distributor plate is clipped to the panel plate. Furthermore, the load distributor plate and the panel plate may also be fixed by common fastening devices on the one or more holders.

BRIEF DESCRIPTION OF THE DRAWING

These and further objects, features and advantages of the present invention will become more readily apparent from the following detailed description thereof when taken in conjunction with the accompanying drawings wherein:

The sole FIGURE is a cross-sectional view of a knee protection device in a lower area of a dashboard, in the form of a load distributor plate and a panel plate arranged in front of this load distributor plate toward the vehicle interior.

DETAILED DESCRIPTION OF THE DRAWING

The knee protection device 1 extends in the transverse direction of the vehicle in front of the knees of a seated driver and/or a front passenger. The knee protection device 1 is constructed separately from a dashboard 2 and is disposed on holders 6 on both sides on a lower area of the dashboard 2. The device comprises a load distributor plate 3 and a panel plate 5 with a covering 10 arranged in front of the distributor plate 3 toward the vehicle interior 4. The holders 6 support the knee protection device 1 and are deformed in the event of a crash and when the panel plate 5 is acted upon from the vehicle interior 4 to reduce impact energy.

The load distributor plate 3 itself must deform as little as possible and not break or buckle in order to ensure a controlled force transmission and avoid injuring the occupant. In order to achieve this, a conventional plastic material is selected for the load distributor plate 3 which ensures a high stability, reacts in an impact-resistant manner and nevertheless, in the event of the impact of an occupant, offers a lower hardness to the occupant than metal. In order to increase the stability of the load distributor plate 3 and thus ensure also the transmission of high forces into the holders 6, this load distributor plate 3 has, on its side 7 facing away from the panel plate 5, material reinforcements 8 which are advantageously molded on in manufacturing terms and which may be constructed, for example, as a rib structure or as ducts molded by internal gas pressure. Furthermore, the characteristics of this load distributor plate 3 can also be improved by a higher fiber fraction in the plastic material.

The panel plate 5 takes over the function of a soft damping for the contact of the occupant's knees in the normal driving operation. For this purpose, by a foam cushioning can be provided on the surface 9 of the face of the plates pointing to the vehicle interior 4. Because of its material, the plate 5 also has an impact-resistant construction so that, to the extent possible, it will not break under a load. The panel plate 5 also reinforces the stability of the load distributor plate 3. The separately manufactured panel plate 5 and the load distributor plate 3 can be provided with the characteristics which are in each case advantageous for their function and, in combination with one another, optimize the effect of the knee protection device 1.

The joint and approximately uniform or isochronously demanded function of the load distributor plate 3 and of the panel plate 5 is achieved in that the load distributor plate 3 and the panel plate 5 are connected, for example, by a glue, with one another in a flat or in a sandwich-type construction and/or are clipped to one another.

In addition, the load distributor plate 3 and the panel plate 5 are fixed by joint fastening devices 11, for example by screwing to the holder 6, in which case necessary fastening elements can be advantageously implemented as an insert in the plastic material again in terms of manufacturing expediency. The panel plate 5 and the load distributor plate 3 can be manufactured at reasonable cost and ideally for the later recycling from the same plastic material as a unitary system, which also achieves a low weight of the knee protection device 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Knee protection device in a motor vehicle, comprising a plastic bending-resistant load distributor plate arranged in the lower area of a vehicle dashboard, extending in a transverse direction of the vehicle and supported on at least one holder which is bendable in an energy-absorbing manner, and an impact-resistant panel plate is operatively disposed in front of and is joined with the load distributor plate at least in a region of knee impact.

2. Knee protection device according to claim 1, wherein the load distributor plate includes molded-on material reinforcements.

3. Knee protection device according to claim 1, wherein the load distributor plate has a high fiber fraction.

4. Knee protection device according to claim 1, wherein the load distributor plate and the panel plate (5) are flatly connected with one another.

5. Knee protection device according to claim 1, wherein the load distributor plate is clipped to the panel plate.

6. Knee protection device according to claim 1, wherein the load distributor plate and the panel plate are fixed by common fastening devices on the at least one holder.

7. Knee protection device according to claim 1, wherein the load distributor plate and the panel plate are constructed of the same plastic material.

8. Knee protection device according to claim 7, wherein the load distributor plate includes molded-on material reinforcements.

9. Knee protection device according to claim 8, wherein the load distributor plate has a high fiber fraction.

10. Knee protection device according to claim 9, wherein the load distributor plate operatively rests against the panel plate.

11. Knee protection device according to claim 10, wherein the load distributor plate and the panel plate are flatly connected with one another.

12. Knee protection device according to claim 11, wherein the load distributor plate is clipped to the panel plate.

13. Knee protection device according to claim 11, wherein the load distributor plate and the panel plate are fixed by common fastening devices on the at least one holder.

14. Knee protection device according to claim 11, wherein the load distributor plate and the panel plate are constructed of the same plastic material.

15. Knee protection device according to claim 14, wherein the load distributor plate is clipped to the panel plate.

16. Knee protection device according to claim 14, wherein the load distributor plate and the panel plate are fixed by common fastening devices on the at least one holder.

* * * * *